United States Patent [19]

Hynes

[11] Patent Number: 5,372,170

[45] Date of Patent: Dec. 13, 1994

[54] RESILIENT INTEGRALLY SPRUNG WHEEL FOR A VEHICLE

[75] Inventor: Edward G. Hynes, Randburg, South Africa

[73] Assignee: Julian Bryan Hutchins, Bryanston, South Africa

[21] Appl. No.: 742,339

[22] Filed: Aug. 8, 1991

[30] Foreign Application Priority Data

Aug. 8, 1990 [ZA] South Africa ............... 90/6242

[51] Int. Cl.⁵ .................................. B60C 7/00
[52] U.S. Cl. ............................... 152/42; 152/40; 152/17
[58] Field of Search ............... 152/17, 40, 41, 42, 152/43, 44, 7, 1

[56] References Cited

U.S. PATENT DOCUMENTS

| 825,821 | 7/1906 | Giles et al. ............ 152/41 X |
| 915,884 | 3/1909 | Poths ...................... 152/42 |
| 1,213,834 | 1/1917 | Bunzlau et al. .......... 152/42 |
| 1,433,531 | 10/1922 | Clark et al. ............. 152/42 |
| 2,191,762 | 2/1940 | Horn . | |

FOREIGN PATENT DOCUMENTS

| 173821 | 12/1916 | Canada ..................... 152/42 |
| 262992 | 7/1913 | German Dem. Rep. . |
| 1617897 | 11/1950 | Germany . |
| 27122 | 1/1956 | Germany ................... 152/41 |
| 1023349 | 1/1958 | Germany . |
| 8010569 | 7/1981 | Germany . |
| 647923 | 10/1962 | Italy ........................ 152/44 |
| 26167 | of 1905 | United Kingdom ....... 152/42 |
| 763432 | 12/1956 | United Kingdom . |

Primary Examiner—Russell D. Stormer
Attorney, Agent, or Firm—Jacobson, Price, Holman & Stern

[57] ABSTRACT

The wheel includes a central hub suitable for mounting to an axle and a rigid annular outer rim supported on the hub by a plurality of elastomeric support assemblies to impart integral springing to the wheel, the elastomeric support assemblies including an annular elastomeric member located at its first and second ends by first and second mounting members one of which preferably is cup shaped to engage with the outer surface of the end of the elastomeric member and the other of which includes a frusto conical member to engage with the inside of the other end of the elastomeric member.

22 Claims, 3 Drawing Sheets

RESILIENT INTEGRALLY SPRUNG WHEEL FOR A VEHICLE

INTRODUCTION TO THE INVENTION

This invention relates to wheels of the type used for supporting and mobilising vehicles on surfaces. More specifically it is intended to replace the conventional pneumatic tire and rim in heavy duty applications where vehicles are operating in an environment which is arduous and aggressive towards conventional pneumatic tires resulting in premature failure.

BACKGROUND TO THE INVENTION

There are several types of wheels commonly used for vehicles, wheels having pneumatic or other fluid filled tires and, as such, having considerable inherent shock absorbent characteristics, and wheels which incorporate a simple elastomeric "solid" tire having poor shock absorbing characteristics.

For protection of a heavy duty vehicle, its operator and its load, wheels with gas or fluid filled tyres are used in a majority of applications. This type of tire can be costly and have a relatively short working life. Factors affecting the life of these tires include mechanical damage due to arduous and aggressive physical conditions under which they may be used and the possible presence of mineral oil spillages on the operating surfaces which degrades the elastomeric material of the tire carcass and wearing surface.

Where an elastomeric "solid" tire is used in such applications the resultant ride is usually so hard as to cause injury or damage to the vehicle, its operator or its load. Solutions to the above problems include the provision of a solid tired wheel incorporating its own integral shock absorbing and springing characteristics. Wheels of this type have been proposed in the past and include the location of elastomeric elements of various configurations between a rigid outer rim carrying the tire and an inner hub. It is the inventor's opinion that such configurations would not prove satisfactory in handling the various tension and shear forces placed on the elastomeric elements during normal use of the wheels.

Among the characteristics of conventional pneumatic tires used on vehicles with no inherent suspension are the ability to carry the mass of the vehicle and the ability to provide tractive effort for the vehicle and with the benefit of inherent shock absorption. In a conventional pneumatic tire the wearing surface and the carcass combine to provide these qualities.

An object of this invention is to provide a novel wheel having these same characteristics and which separates the wearing surface from the suspensive/shock absorbing components.

SUMMARY OF THE INVENTION

According to the invention a wheel, comprises a central hub and a rigid outer rim of generally annular configuration supported on the hub by a plurality of elastomeric support assemblies extending therebetween, the wheel being characterised in that each support assembly includes at least part of an element of suitable elastomeric material located by opposing and substantially co-axial first and second support members, the first support member being of cup-shaped configuration and engaging a correspondingly shaped surface at one end of the element and the second support member being tapered in a regular configuration about its axis and projecting into and engaging a correspondingly shaped recess in the element.

Further, according to the invention, the elastomeric element includes a bore therethrough and the recess forms part of the bore.

Still further, according to the invention, the elastomeric element is substantially regular in cross sectional configuration around the axis of the bore.

Still further, according to the invention, the first support member and corresponding shaped surface are frusto conical.

Still further, according to the invention, the second support member and correspondingly shaped surface are frusto conical.

Still further, according to the invention, the cone angles of the first and second support members and the correspondingly shaped surfaces of the elastomeric element are between sixty and one hundred and twenty degrees.

Still further, according to the invention, the cone angles are about ninety degrees.

Still further, according to the invention, the elastomeric member is pre-compressed between the first and second support members.

Still further, according to one aspect of the invention, the elastomeric element is annular in configuration.

Still further, according to another aspect of the invention, the elastomeric element is rectangular when viewed in the direction of its axis.

Still further, according to another aspect of the invention the elastomeric element is elliptical when viewed in the direction of its axis.

Still further, according to another aspect of the invention the elastomeric element is oval when viewed in the direction of its axis.

Still further, according to another aspect of the invention, the elastomeric element is polygonal when viewed in the direction of its axis.

Still further, according to the invention, the sectional elevation through one part of the elastomeric element may be regular polygonal, preferably square, or may be circular.

Still further, according to the invention, the one support member is mounted with respect to the hub and the other with respect to the rim.

Still further, according to one aspect of the invention, substantially the entire elastomeric element is located by the first and second support members.

Still further, according to another aspect of the invention, the elastomeric assembly comprises a pair of second support members in integral back to back configuration and each located in the recess of an elastomeric member and two first support members, one on each side of the assembly.

Still further, according to an aspect of the invention, the axes of the assemblies may be arranged radially with respect to the axis of the wheel.

Still further, according to another aspect of the invention, the axes of the assemblies may be tangential to at least one circle concentric with the axis of the wheel.

Still further, according to the invention, the hub includes mounting means for mounting of the wheel to an axle or the like and the mounting means may include suitable bearings.

Still further, according to the invention, the wheel includes at least one tire segment assembly mounted to the annular rim and there are a plurality of segmented tire assemblies in an annular end to end relationship around the periphery of the rim.

Still further, according to the invention, the segmented tire assemblies are of elastomeric material.

The invention also provides for a support assembly as defined.

The invention also provides for an elastomeric element as defined.

The invention also provides for a tire segment assembly as defined.

BRIEF DESCRIPTION OF THE DRAWINGS

Several embodiments of the invention described by way of example only follow, with reference to the accompanying drawings in which.

DETAILED DESCRIPTION OF THE DRAWINGS

Figure 1:
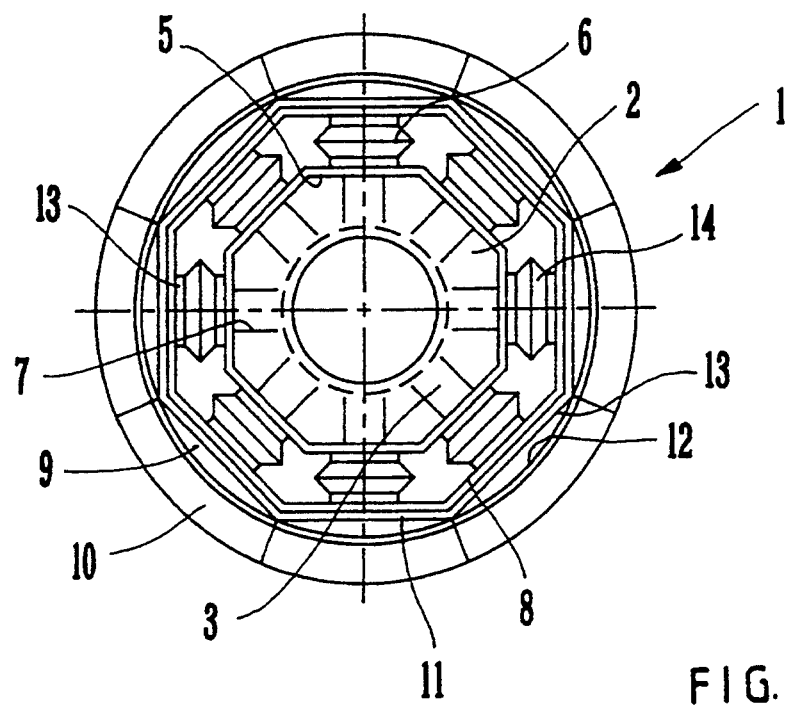
FIG. 1 is a front elevation of the wheel of a first embodiment according to the invention.
Figure 2:
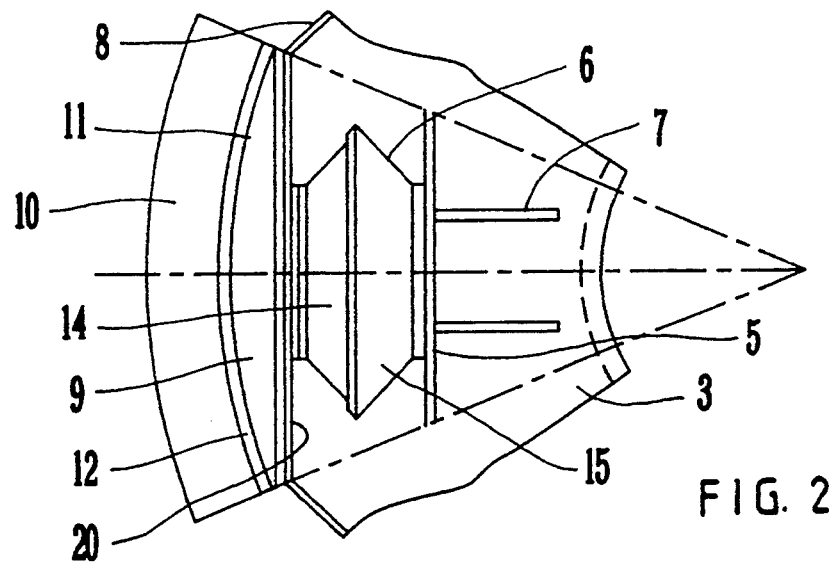
FIG. 2 is an enlarged detail in front elevation of an elastomeric support assembly, a removable tire segment assembly, and associated parts of the wheel of the first embodiment.
Figure 3:
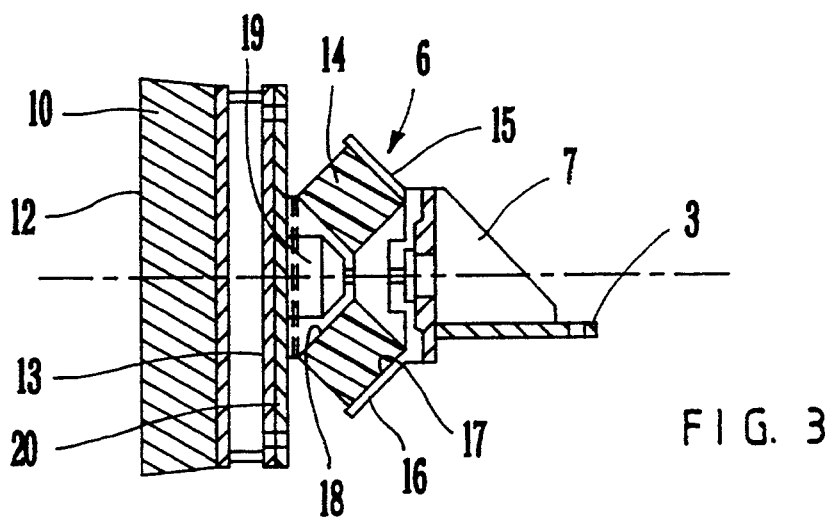
FIG. 3 is a sectional elevation of the elastomeric support assembly viewed at ninety degrees to the elevation of FIG. 2.

In the first embodiment of the invention as depicted in FIGS. 1 to 4, a wheel (1), suitable for use mainly on heavy duty, off road vehicles operating in arduous and aggressive conditions such as underground trackless mining conditions is provided.

The wheel (1) comprises a central hub (2) which includes an octagonal steel centre plate (3) having a circular, central aperture (4) therethrough. This aperture (4) is intended to accommodate bearings and/or other mounting means for mounting the wheel to a suitable hub and/or axle. The periphery of the central hub (2) has a continuous octagonal flange whose faces serve as base plates (5) for supporting elastomeric support assemblies (6).

The base plates (5) are each reinforced with a pair of spaced buttress plates (7) extending from the side thereof closest to the aperture (4) to the adjacent face of the centre plate (3).

Mounted to the central hub (2) by eight annular elastomeric support assemblies (6) is a rigid outer annular rim (8) which is of octagonal configuration. This annular outer rim (8) serves to mount and locate eight tire segment assemblies (9) which, together, form a continuous tire for the wheel.

The segmented tire assemblies (9) each comprise an arc shaped elastomeric element (10) bonded to a mounting assembly shoe (11) which comprises a curved plate (12) and a flat backing plate (13). The backing plate (13) is adapted for fixing to a corresponding side of the outer annular rim (8) by means of bolts.

Figure 4:
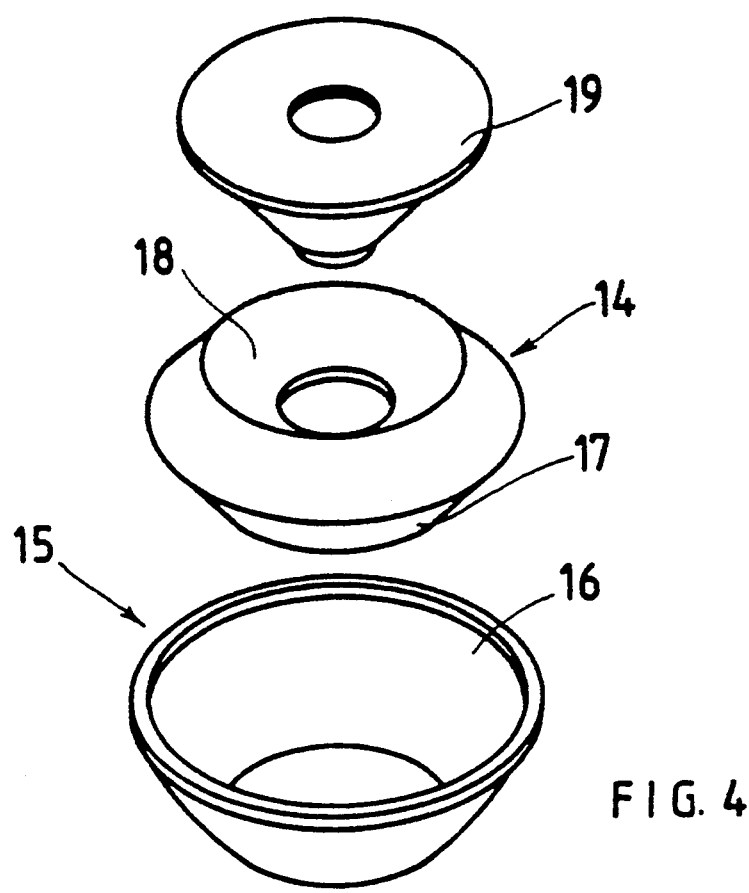
FIG. 4 is an exploded view of an elastomeric assembly of the invention.

Reverting to the elastomeric assemblies (6), and particularly to FIG. 4 of the drawings, it may be seen that these assemblies (6) each include an annular elastomeric support element (14), the cross sectional configuration of which is in the form of a pair of square sections with their corners oriented to be in planes parallel to and normal to a central axis of the elastomeric support assembly (6).

The elastomeric support element (14) is located in a first support member in the form of a dish shaped supporting cup member (15) fixed to a flange base plate (5) and having support surfaces (16) encompassing a cone angle of forty five degrees to the normal of the axis of the assembly. This member (15) supports the one outer surface (17) of the elastomeric support element (14).

The opposing inner surface (18) of the elastomeric support element is supported by a second support member in the form of a frusto conical support member (19) and which is fixed to the inside of the corresponding flat portion (20) of the outer annular octagonal rim (8).

It should be noted that during assembly of the wheel the elastomeric elements are pre-compressed on location between the support elements.

It will readily be appreciated that the construction and configuration of the elastomeric support assembly (6) provides compressive elastomeric resistance thereby providing the wheel with its own inherent integral shock absorption or springing to resist imposed external loads on the wheel. The external forces imposed on the wheel are due to radial loads, both static and dynamic; torque, due to the driving and braking force of the vehicle; and side loads as would be found when the wheel is located on a non horizontal or uneven surface or under dynamic conditions. The configuration of the elastomeric support assemblies (6) is such that the supporting cup member (15) and the frusto conical support member (19) contains the elastomeric support element (14) such as to concentrate the forces imposed on the element in a compressive manner rather than in shear or tension.

Still further, by enhanced compounding, the inherent properties of the elastomeric support element (14) can be varied such that the spring rate of the material can be adjusted land such that it possesses damping properties.

Alternative configurations for the elastomeric elements are shown in FIGS. 6a, 6b, 6c and 6d which depict elements which are polygonal (octagonal), elliptical, oval, and rectangular.

Figure 7:
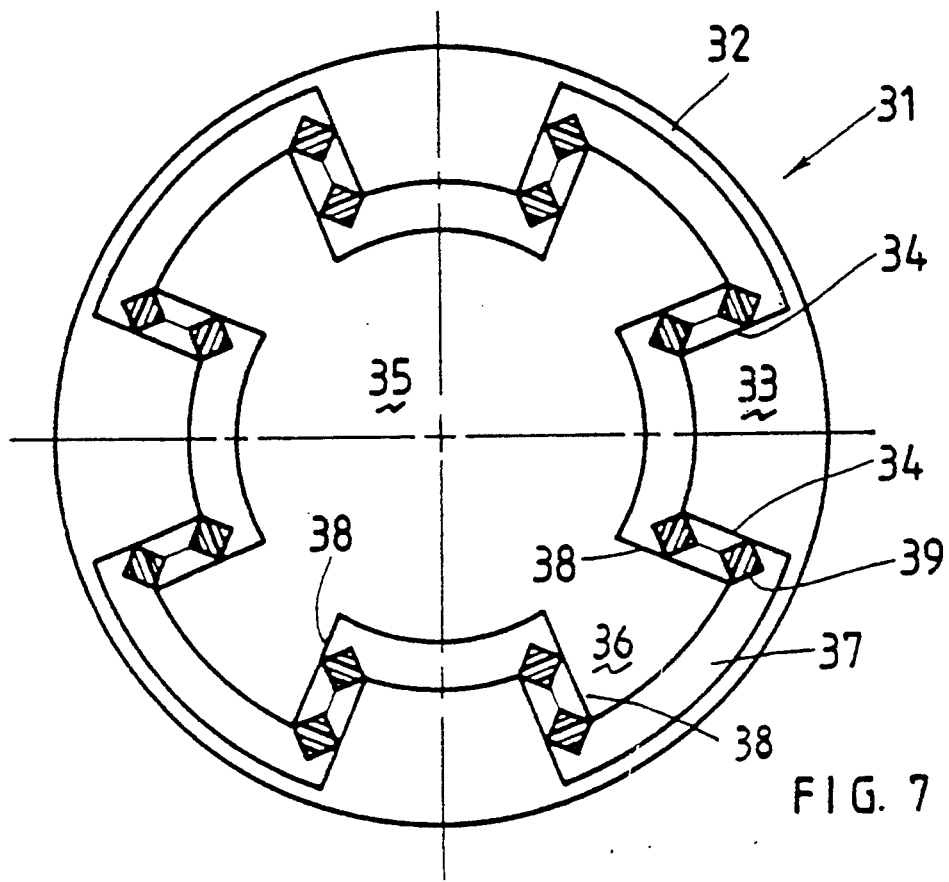
FIG. 7 is a front elevation of the wheel of a second embodiment according to the invention.

FIG. 7 of the drawings illustrates, in diagrammatic form an alternative wheel according to the invention. The wheel (31) comprises an outer rim (32) having four inwardly projecting formations (33) of a generally tapering configuration. These formations (33) have oppositely directed mounting surfaces (34) which lie on radii of the rim.

A central hub (35) for the wheel includes a central circular portion from which projects four formations (36) of generally tapering configuration which are located in the spaces (37) between adjacent formations (33).

The hub formations (36) include oppositely directed surfaces (38) which are substantially parallel to the surfaces (34) of the formations (33).

Mounted between opposing pairs of surfaces (34) and (38) on the projections (33) and (36) respectively are elastomeric support assemblies (39) of substantially the same configuration as those described in the first embodiment above. They will, therefore, not be described in any further detail here. The axes of these support assemblies (39) are tangential to a circle concentric with the axis of the wheel.

It is envisaged that the wheel of this configuration will operate in much the same manner as that of the other embodiment.

Figure 5:
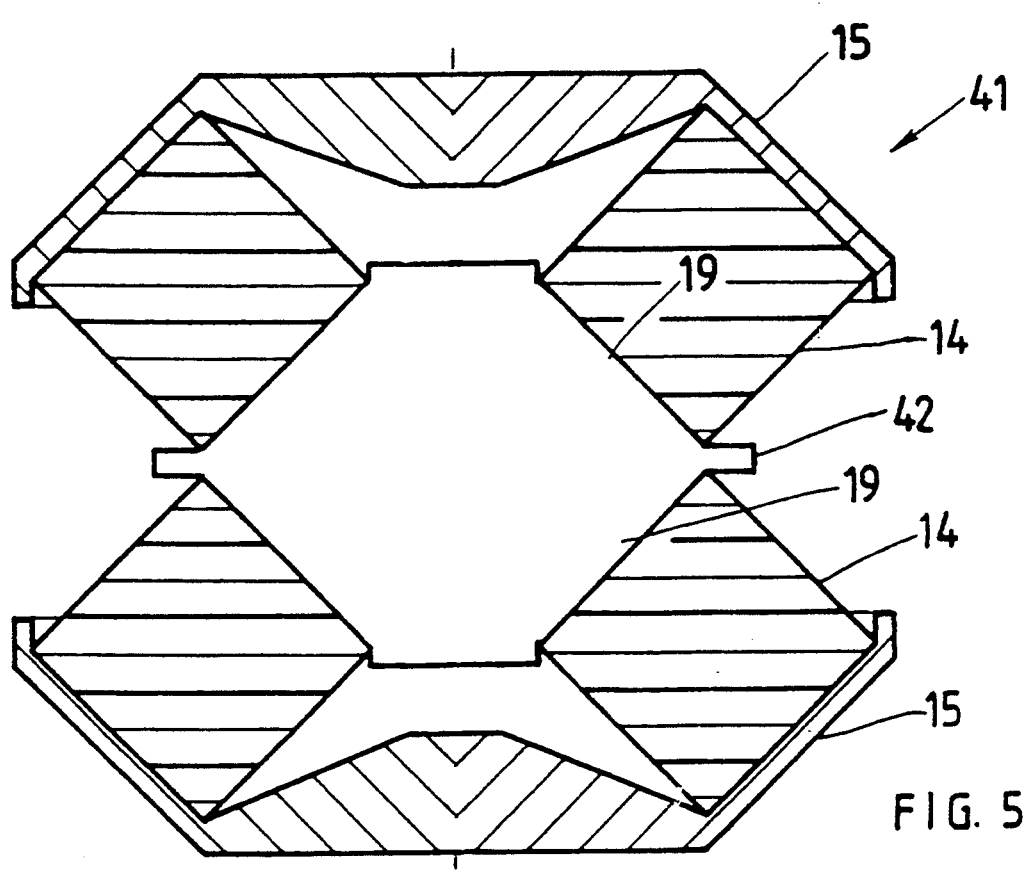
FIG. 5 is a sectional elevation of an alternative elastomeric support assembly.
Figure 6A:
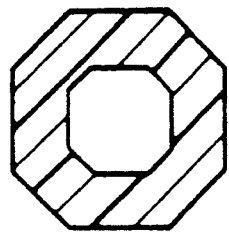
FIGS. 6a, 6b, 6c and 6d are plan views of alternative elastomeric elements.
Figure 6B:
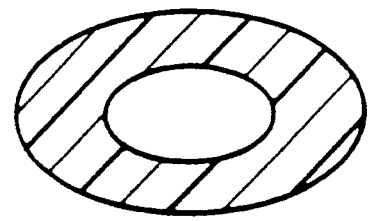
Figure 6C:
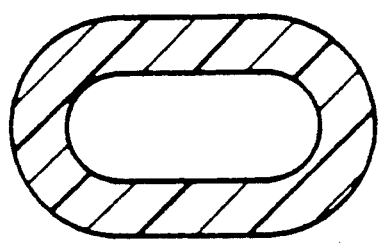
Figure 6D:
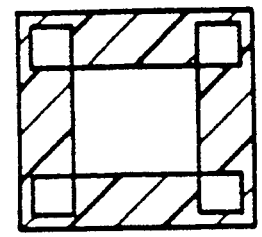

FIG. 5 of the drawings shows an alternative elastomeric support assembly. This assembly (41) essentially comprises two of the assemblies shown in FIGS. 1 to 4 in back to back relationship with the two frusto conical support members (19) being integral with each other and each supporting an elastomeric element (14). The two elements are separated by a radially extending rim (42) which lies in the plane of the bases of the two frusto conical support members (19).

On each side the assembly includes supporting cup members (15).

The invention provides a wheel, the elastomeric tire segment assemblies of which can be individually changed and replaced, and also which is not prone to the adverse characteristics of pneumatic tires, with an adequate amount of shock absorbing characteristics.

What we claim as new and desire to secure by Letters Patent is:

1. A resilient, integrally sprung wheel for a vehicle comprising a central hub and a rigid outer rim of generally annular configuration supported on the hub by a plurality of equally spaced elastomeric support assemblies extending therebetween, wherein each said support assembly comprises:

an elastomeric support element of suitable elastomeric material having a central axis, an outer surface at one end thereof extending around the axis and acutely inclined thereto, and a coaxial recess in the other end thereof providing an inner surface opposing the outer surface;

a cup shaped first support member coaxially located with respect to the elastomeric support element and engaging the outer surface thereof over substantially its entire area; and a tapered second support member coaxially located with respect to the elastomeric support element and engaging the inner surface over substantially its entire area.

2. A wheel as claimed in claim 1 in which the elastomeric element comprises an axial bore therethrough and the recess forms part of the bore.

3. A wheel as claimed in claim 2 in which the sectional elevation through a part of the elastomeric element and lying in a plane passing through the axis thereof is regular polygonal.

4. A wheel as claimed in claim 3 in which the sectional configuration is square.

5. A wheel as claimed in claim 2 in which the sectional elevation through a part of the elastomeric element and lying in a plane passing through the axis thereof is circular.

6. A wheel as claimed in claim 1 in which the elastomeric element is substantially regular in cross sectional configuration around the axis of the bore.

7. A wheel as claimed in claim 1 in which the first support member and outer surface of the elastomeric element are frusto conical.

8. A wheel as claimed in claim 7 in which the second support member and inner surface of the elastomeric element are frusto conical.

9. A wheel as claimed in claim 8 in which the cone angles of the first and second support members and the outer and inner surfaces of the elastomeric element are between sixty and one hundred and twenty degrees.

10. A wheel as claimed in claim 9 in which the cone angles are about ninety degrees.

11. A wheel as claimed in claim 1 in which the elastomeric element is pre-compressed between the first and second support members.

12. A wheel as claimed in claim 1 in which the elastomeric element is annular in configuration.

13. A wheel as claimed in claim 1 in which the elastomeric element is rectangular when viewed in the direction of its axis.

14. A wheel as claimed in claim 1 in which the elastomeric element is elliptical when viewed in the direction of its axis.

15. A wheel as claimed in claim 1 in which the elastomeric element is oval when viewed in the direction of its axis.

16. A wheel as claimed in of claim 1 in which the elastomeric element is polygonal when viewed in the direction of its axis.

17. A wheel as claimed in claim 1 in which the elastomeric assembly comprises a pair of second support members in integral back to back configuration and each located in the recess of an elastomeric member and two first support members one on each side of the assembly.

18. A wheel as claim in claim 1 in which the one support member is mounted with respect to the hub and the other with respect to the rim.

19. A wheel as claimed in claim 1 in which the axes of the assemblies are arranged radially with respect to the axis of the wheel.

20. A wheel as claimed in claim 1 in which the axes of the assemblies are tangential to at least one circle concentric with the axis of the wheel.

21. A wheel as claimed in claim 1 in which the hub includes mounting means for mounting of the wheel to an axle.

22. A wheel as claimed in claim 1, wherein the inner surface of the elastomeric support element is substantially parallel to the outer surface thereof.

* * * * *